(12) United States Patent
Taupeau et al.

(10) Patent No.: US 11,802,630 B2
(45) Date of Patent: Oct. 31, 2023

(54) FLUID DISTRIBUTOR WITH IMPROVED OPERATION

(71) Applicant: BONTAZ CENTRE R & D, Marnaz (FR)

(72) Inventors: Anthony Taupeau, Saint-Jorioz (FR); Nicolas Bonnevay, Annecy (FR); Fabien Casara, La Muraz (FR)

(73) Assignee: BONTAZ CENTRE R & D, Marnaz (FR)

( * ) Notice: Subject to any disclaimer, the term of this patent is extended or adjusted under 35 U.S.C. 154(b) by 260 days.

(21) Appl. No.: 17/399,132

(22) Filed: Aug. 11, 2021

(65) Prior Publication Data

US 2022/0049792 A1 Feb. 17, 2022

(30) Foreign Application Priority Data

Aug. 14, 2020 (FR) ..................................... 2008504

(51) Int. Cl.
*F16K 37/00* (2006.01)
*F16K 11/085* (2006.01)
(Continued)

(52) U.S. Cl.
CPC ........ *F16K 37/0033* (2013.01); *F16K 11/085* (2013.01); *F16K 31/042* (2013.01);
(Continued)

(58) Field of Classification Search
CPC .. F16K 37/0033; F16K 11/085; F16K 31/042; F16K 31/043; F16K 31/041;
(Continued)

(56) References Cited

U.S. PATENT DOCUMENTS

| 4,152,612 A | * | 5/1979 | Endo | ...................... | H02K 11/20 74/421 A |
| 4,983,867 A | * | 1/1991 | Sakamoto | .............. | H02K 37/18 310/179 |

(Continued)

FOREIGN PATENT DOCUMENTS

| EP | 3483454 A1 | 5/2019 |
| JP | 2015231275 A | 12/2015 |
| WO | 2019129984 A1 | 7/2019 |

OTHER PUBLICATIONS

Search Report issued in French Patent Application No. 2008504 dated Apr. 12, 2021.

*Primary Examiner* — Craig M Schneider
*Assistant Examiner* — Christopher D Ballman
(74) *Attorney, Agent, or Firm* — Pearne & Gordon LLP

(57) ABSTRACT

Valve including a valve body with an inlet port and two outlet ports, a core capable of allowing or interrupting the flow of fluid between the inlet port and the outlet ports, the core being rotatably movable about a longitudinal axis and configured to assume two end angular positions, a gear motor comprising an output shaft driving the core, sensors for managing the electric motor mounted to a first, facing electronic board, an angular position sensor of the output shaft, mounted to a second electronic board, the first electronic board and the second electronic board being disposed in two distinct planes orthogonal to the longitudinal axis, a magnet rotatably attached to the output shaft, the position and angular extension of which are such that the magnet does not disturb the operation of the management sensors.

11 Claims, 5 Drawing Sheets

(51) Int. Cl.
 *F16K 31/04* (2006.01)
 *H02K 7/14* (2006.01)
 *H02K 11/215* (2016.01)
 *F16K 31/53* (2006.01)
 *H02K 1/14* (2006.01)
 *H02K 7/116* (2006.01)
 *F16H 57/02* (2012.01)

(52) U.S. Cl.
 CPC .......... *F16K 31/043* (2013.01); *F16H 57/02* (2013.01); *F16K 31/041* (2013.01); *F16K 31/046* (2013.01); *F16K 31/535* (2013.01); *F16K 37/0041* (2013.01); *H02K 1/148* (2013.01); *H02K 7/116* (2013.01); *H02K 7/14* (2013.01); *H02K 11/215* (2016.01); *H02K 2201/15* (2013.01); *H02K 2203/03* (2013.01)

(58) Field of Classification Search
 CPC .... F16K 31/535; F16K 37/0041; F16K 31/08; F16K 31/046; H02K 1/148; H02K 7/116; H02K 11/215; H02K 2201/15; H02K 2203/03; H02K 7/14; F16H 57/02
 See application file for complete search history.

(56) References Cited

U.S. PATENT DOCUMENTS

| | | | | |
|---|---|---|---|---|
| 5,429,558 | A * | 7/1995 | Lagarde | F16H 1/46 74/462 |
| 6,857,981 | B2 * | 2/2005 | Hori | H02K 5/225 475/149 |
| 7,578,761 | B2 * | 8/2009 | Nishikawa | B60K 6/44 475/116 |
| 7,591,448 | B2 * | 9/2009 | Martin | F15B 13/0839 137/884 |
| 8,339,003 | B2 * | 12/2012 | Prudham | H02K 21/14 310/83 |
| 9,193,258 | B2 * | 11/2015 | Hoshinoya | B60K 7/0007 |
| 9,608,492 | B2 * | 3/2017 | Nagumo | H02K 3/28 |
| 10,612,644 | B2 * | 4/2020 | Rüsing | F16H 57/029 |
| 11,578,685 | B2 * | 2/2023 | Graf | F16K 49/005 |
| 11,603,869 | B2 * | 3/2023 | Niklaus | H02K 7/116 |
| 2005/0179334 | A1 * | 8/2005 | Yoshinaga | H02K 29/03 310/156.47 |
| 2005/0225190 | A1 * | 10/2005 | Kinashi | H02K 1/2733 310/156.43 |
| 2006/0111214 | A1 * | 5/2006 | Yan | H02K 7/116 475/5 |
| 2006/0138894 | A1 * | 6/2006 | Harada | H02K 15/02 310/156.19 |
| 2012/0074820 | A1 * | 3/2012 | Takeuchi | H02K 29/08 310/75 R |
| 2017/0197502 | A1 | 7/2017 | Yukishima et al. | |
| 2020/0340501 | A1 | 10/2020 | Niklaus et al. | |
| 2021/0006699 | A1 | 1/2021 | Joao et al. | |
| 2021/0066999 | A1 | 3/2021 | Taupeau et al. | |
| 2021/0367458 | A1 | 11/2021 | Taupeau et al. | |

* cited by examiner

FLUID DISTRIBUTOR WITH IMPROVED OPERATION

CROSS-REFERENCE TO RELATED APPLICATIONS

This application claims priority to French Patent Application No. 2008504 filed on Aug. 14, 2020, the entire content of which is incorporated by reference herein.

TECHNICAL FIELD AND STATE OF THE ART

The present invention is concerned with a fluidic distributor driven by a gear motor with improved operation.

In the automotive industry, fluidic distributors, also called valves, which are driven on/off or proportionally by a gear motor, are used. These valves are used, for example, to manage the supply of coolant, fuel, oil, etc.

The gear motor may comprise a rotor with magnets, housed in a stator with coils. The gear reducer is housed in the rotor. The output shaft is coaxial with the rotor. Such a gear motor is described in document WO2019/129984.

This gear motor has a reduced overall size which makes it suitable for driving valves, for example hydraulic distributors in automobile vehicles. Furthermore, it implements a centring axis which ensures guidance, recentring of all the moving elements and also provides the function of a sliding bearing for the moving elements. The wear of the gear reducer is limited.

The gear motor comprises sensors for motor management and at least one angular position sensor of the output shaft mounted, the sensors being mounted to an electronic board. The motor management sensors and the position sensor are sensitive to a magnetic field, for example Hall effect sensors.

The motor management sensors are sensitive to the multipole magnet of the motor, and the position sensor is sensitive to a magnet rotatably fixedly mounted to the output shaft.

However, it has been noticed that the position magnet can interfere with the operation of the motor management sensors, and that the motor magnet can interfere with the operation of the position sensor.

DISCLOSURE OF THE INVENTION

It is therefore a purpose of the present invention to provide a fluidic distributor driven by a gear motor with improved operation.

The purpose set out above is achieved by a fluidic distributor comprising a valve body with a core, a gear motor comprising a stator, a rotor, a gear reducer and an output shaft to which the core is rotatably secured. Motor management sensors are mounted to a first electronic board, at least one output shaft position sensor is mounted to a second electronic board axially remote from the first electronic board. A magnet is rotatably fixedly mounted to the output shaft, the rotational movement of which is detected by the position sensor. The location of the position sensor relative to the output shaft and the angular extension of the magnet are such that the magnetic field of the magnet has little or no effect on the management sensors.

On the one hand, by moving the position sensor axially away from the management sensor, disturbances due to the motor magnet on the position sensor are reduced, and on the other hand, by angularly offsetting the position magnet away from the management sensor, disturbances of the position magnet on the management sensor are reduced.

The operation of the distributor is thus improved.

Advantageously, the first electronic board is located in the case of the gear motor and the second board is located outside the case.

Advantageously, the position magnet has an angular extension such that it never comes into vertical line with one of the management sensors.

One subject-matter of the present application is therefore a rotary fluid distributor comprising a valve body with at least one fluid inlet port and a fluid outlet port, a core capable of allowing or interrupting the flow of fluid between the inlet port and the outlet port, said core being rotatable about a longitudinal axis and configured to assume two end angular positions, a gear motor comprising a gear reducer, a brushless electric motor and an output shaft with a longitudinal axis, the core being rotatably secured to said output shaft, sensors for managing the electric motor mounted to a first electronic board facing a side face of a rotor of the gear motor, at least one angular position sensor to detect the angular position of the output shaft, mounted to a second electronic board, the first electronic board and the second electronic board being disposed in two distinct planes orthogonal to the longitudinal axis, a permanent magnet rotatably fixedly mounted to the output shaft and disposed so as to be detected by the angular position sensor. Said permanent magnet has the shape of an arc of a circle whose position and angular extension are such that, whatever the angular position of the output shaft for placing the core in any position between its end angular positions, considering a projection of said magnet and the projection of the management sensors onto the same plane orthogonal to the longitudinal axis, the projection of the permanent magnet does not face the projection of the management sensors considering a radial direction.

In a preferred example, the gear motor comprises a casing housing the motor and the gear reducer and in which the first electronic board is housed in the casing and the second electronic board is disposed outside the casing between the casing and the valve body.

Advantageously, the permanent magnet is a diametrically magnetised magnet.

In an exemplary embodiment, the valve body comprises two outlet ports, and one of the end angular positions corresponds at least predominantly to a flow between the inlet port and one of the outlet ports, and the other end angular position corresponds at least predominantly to a flow between the inlet port and one of the outlet ports.

Advantageously, the rotary fluidic distributor comprises orientation means for orientating the permanent magnet relative to the output shaft so as to position the north and south poles of the magnet in a given orientation relative to the output shaft.

The orientation means comprises, for example, a spot facing formed in the magnet cooperating with a flat member carried by the output shaft and a projecting member carried by the output shaft or permanent magnet cooperating with a recessed element carried by the permanent magnet or output shaft respectively.

The permanent magnet is preferably bonded to the output shaft.

The motor may comprise coils attached and electrically connected to the first electronic board.

Advantageously, the gear motor comprises three or a multiple of three coils.

Preferably, the gear reducer is at least partly housed in the rotor.

The gear reducer is advantageously a planetary gear reducer, the gear motor comprising a single axis forming the axis of rotation of the rotor and the axis of the planetary gear reducer.

BRIEF DESCRIPTION OF THE DRAWINGS

The present invention will be better understood based on the following description and the appended drawings in which.

DETAILED DISCLOSURE OF PARTICULAR EMBODIMENTS

Figure 1:
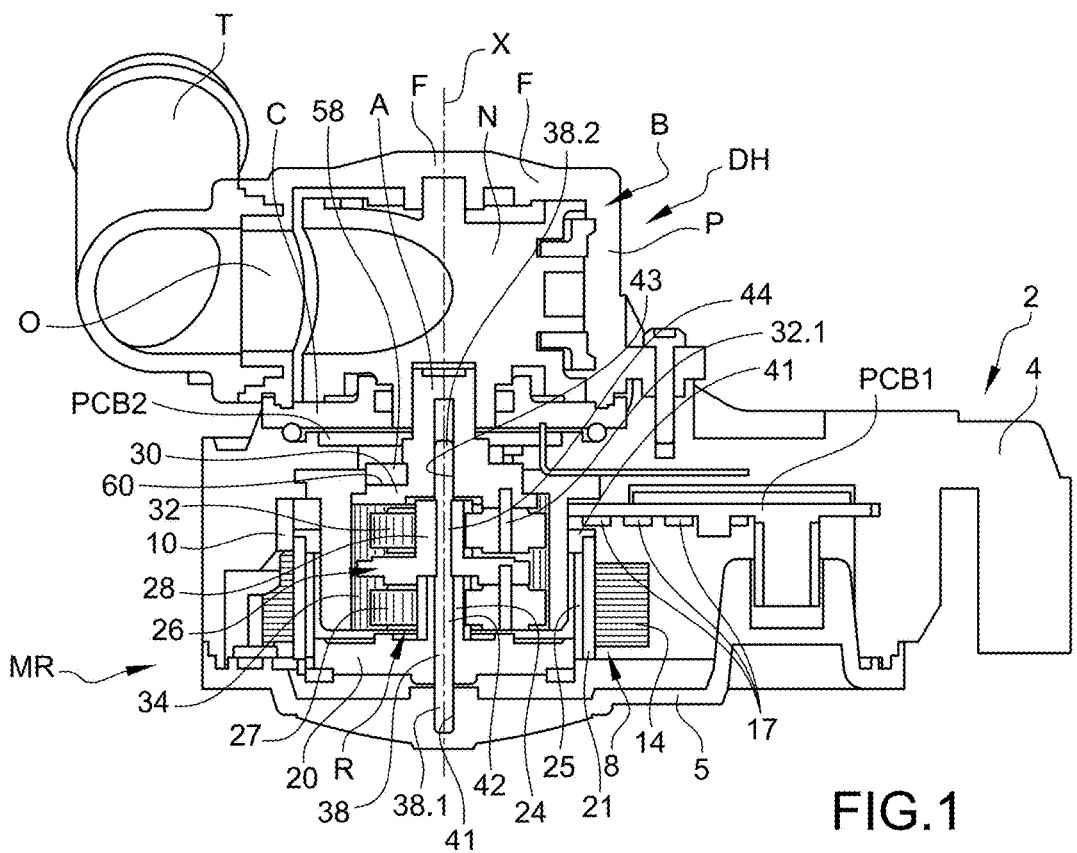
FIG. 1 is a longitudinal cross-section view of an example of a hydraulic distributor according to the invention.
Figure 2:
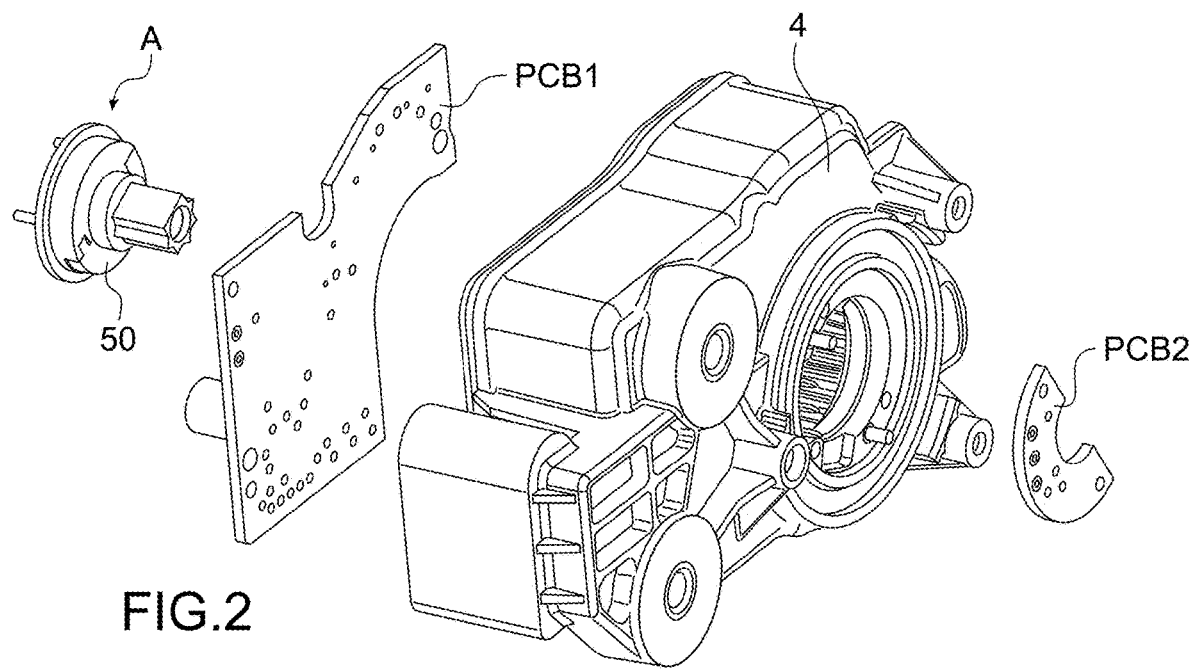
FIG. 2 is a perspective view of the gear motor of FIG. 1, with the electronic boards and the output shaft being represented outside the gear motor.

In FIG. 1, an exemplary hydraulic distributor DH driven by a gear motor MR according to the invention can be seen in a longitudinal cross-section view. In FIG. 2 the gear motor can be seen alone.

The distributor DH comprises a valve body B of an essentially cylindrical shape of revolution about an axis X, and a core N mounted in the valve body B and capable of rotating in the valve body B.

In the example represented, the valve body B comprises a bottom F and a cylindrical side wall P as a single piece, and a valve cover C to close the valve body. The valve cover C is, for example, secured to the valve body B by welding, for example by ultrasonic welding.

The valve body B comprises a supply port (not visible) formed in the side wall P and extending to a conduit for connecting to a liquid source, and at least 2 outlet ports O also formed in the side wall P, each extending to a conduit T for feeding liquid to a given zone, for example a zone to be cooled. The valve body B defines a hydraulic chamber.

The inlet and outlet ports are distributed on the wall about the axis X.

The core N is mounted in the hydraulic chamber and is in engagement with the output shaft A of the gear motor A.

The gear motor extends along a longitudinal axis X. It comprises a casing 2 in which the electric motor M and the planetary gear reducer R are housed. The casing 2 protects the motor and the gear reducer from the external environment. A longitudinal end of the output shaft A on which the core engages projects from the casing 2 through an opening 3.

In the following description, the longitudinal end of the gear motor comprising the output shaft A will be referred to as the "downstream end", the other longitudinal end of the gear motor will be referred to as the "upstream end". The orientation of the various components of the gear motor with respect to these ends may be referred to as "upstream" or "downstream".

The casing 2 comprises a case 4 and a cover 5 closing the case.

The electric motor is a brushless motor and comprises a stator 8 and a rotor 10 disposed in the stator 8.

The stator 8 is made, for example, of a stack of magnetic steel sheets, for example M270-35A steel. Other steels such as M235-35A, M250-35A, and M330-35A may also be used in a non-limiting manner.

For example, the stator is made up of 28 sheets, each 0.35 mm thick. It has a total thickness of 9.8 mm.

The stator comprises a housing for housing the rotor 10; the housing extends through the entire thickness of the stator 8.

Each coil comprises, for example, a plastic body called a field frame, two lugs or connecting plugs, and a wire wound on the body and connected at both ends to both lugs that are to be connected to the electronic board.

In FIGS. 1 and 2, a first electronic board PCB1 to which the pins of the coils 12 are connected and which is used to drive the rotor can be seen. For example, the coils 12 are electrically and mechanically connected to the first electronic board PCB1 by means of lugs which are electrically connected to the coil by mechanical clamping.

In the example represented, there are three coils 12, and generally their number is equal to 3n, with n an integer at least equal to 1. The coils 12 are disposed over an angular sector α1 about the rotor.

The rotor 10 is mounted inside the stator and is for rotating in the stator about the axis X. The rotor 10 comprises, for example, a multi-pole magnet 21 forming the external surface of the rotor and facing the coils.

The rotor 10 comprises a bottom forming a hub 20 comprising, on a downstream face opposite that facing the housing, a pinion 24 forming a first sun gear of the gear reducer R. The first sun gear 24 is thus directly rotatably driven by the hub 20.

The gear reducer also comprises a first planet carrier plate 26 and three first planet gears 27 rotatably mounted to an upstream face of the planet carrier plate 26 about axes parallel to the axis X. The first planet gears 27 mesh with the first sun gear 24. A second sun gear 28 is rotatably integral with the first planet carrier plate 26 and is disposed on the axis X on a downstream face of the first planet carrier plate 26, opposite the upstream face carrying the first planet gears 27.

The gear reducer comprises a second planet carrier plate 30 and three second planet gears 32 rotatably mounted to an upstream face of the second planet carrier plate 30 about axes 32.1 parallel to the axis X. The second sun gear 28 meshes with the second planet gears 32.

Advantageously, the planet gears 27 and 32 are identical, which simplifies the manufacture of the gear motor.

The output shaft A of the gear motor is rotatably integral with the second planet carrier plate 30 and projects from a downstream face of the second planet carrier plate 30 opposite to the upstream face carrying the second planet gears 32.

The output shaft A can be rotatably guided by the perimeter of the opening formed in the cover.

The gear reducer also comprises an outer ring gear 34 of axis X, arranged inside the rotor 10 and outside the first 27 and second 32 planet gears, so that the planet gears 27 and 32 mesh with the ring gear 34. All the elements of the gear reducer are therefore disposed inside the ring gear 34. The ring gear 34 is fixed with respect to the casing 2.

Very advantageously, the ring gear 34 is inserted into the case 4, for example by moulding. Alternatively, the ring gear 34 is attached to the case 4 by welding, bonding, screws, etc.

Very advantageously, a single centring axis 38 passes through the gear reducer R and the motor M and ensures centring of the different elements of the gear reducer and the rotor 10 in relation to the stator 8. The yoke 25 comprises a central passage through the first sun gear allowing the passage of the centring axis 38. The air gap between the rotor 10 and the stator 8 is thus set without the use of bearings. The elimination of bearings contributes to the extension of the life time of the gear motor. Further, the design of the gear motor is simplified and its mass reduced.

The centring axis 38 is held axially and transversely in the gear motor. For this, the internal bottom of the cover 5 comprises a housing 41 receiving one longitudinal end 38.1 of the axis 38, and the second planet carrier plate carrying the output shaft A also comprises a housing 43 between the second planet gears on its upstream face receiving the other end 38.2 of the axis 38. As the second planet carrier plate 30 is guided by the perimeter of the opening in the cover 5 via the output shaft A, the other end of the centring axis 38 is also held axially and transversely. The axis 38 is fixedly mounted in the cover 5, for example the end 38.1 is mounted clamped in the housing 41 of the cover 5.

Further, the first sun gear 24 and the second sun gear 28 comprise in their centre an axial passage 42, 44 respectively, for passing the centring axis 38 therethrough. The diameters of the housings 40, 41 and the axial passages 42, 44 are adjusted to the diameter of the axis 38, in order to ensure that the centring axis 38 is held transversely and that the various gear reducer components are properly rotatably guided.

The axis 38 ensures guidance, recentring of all the moving elements and also provides the function of a sliding bearing for the moving elements.

The centring axis 38 is advantageously made of metal, for example steel, advantageously stainless steel, in order to have sufficient rigidity. The diameter of the shaft can be set accurately by a grinding operation. Advantageously, the axis 38 is produced with great accuracy, for example by machining. Its diameter advantageously has a maximum tolerance of 20 μm and a cylindricity of 5 μm.

The clearances between the axis 38, which is fixed in the casing, and the moving elements are advantageously between 20 μm and 60 μm.

The case and the cover are disposed so that the housings 40 and 41 ensure coaxiality between the centring axis 38 and the ring gear 34.

The implementation of the fixed centring axis and the positioning accuracy, which can be obtained when the case and the cover incorporating the ring gear 34 are made and assembled, makes it very advantageous not to use a ball bearing between the centring shaft and the moving elements rotating about it.

The implementation of this centring axis 38 makes it possible to limit wear of the gear reducer. Further, it facilitates assembly. In the case of gear reducer elements of plastic material, it also ensures that there is sufficient clearance between the elements for them to mesh correctly.

Advantageously, the axes of the planet gears on the planet carrier plates are made of steel, for example stainless steel, to further improve guidance and avoid wear of the gear teeth of the planetary gear reducer.

In addition, the implementation of a single axis makes it possible to significantly reduce losses because the rotatably moving elements of the gear reducer turn about this small-diameter axis.

The gear motor also comprises electric motor management sensors 17 mounted to the first electronic board PCB1, for example Hall effect sensors sensitive to the displacement of the magnet 21 of the rotor. The number of management sensors is equal to 3m where m is an integer greater than 1.

The management sensors 17 are disposed between the coils 12 and the rotor 10 considering a radial direction and both end management sensors delimit an angular sector $\alpha 1$ between them.

The output shaft A is rotatably moved by the electric motor between two end positions PE1 and PE2. A first end position PE1 corresponds to a position of the core connecting the input port to the output port S1 and the end position PE2 corresponds to the position of the core connecting the input port to the output port PE2.

In the example represented, the core pivots through an angle of 96° to switch from the end position PE1 to the end position PE2.

A median position is located 48° from each of the end positions PE1 and PE2.

The gear motor comprises an angular position sensor 56 of the output shaft A in order to detect the angular position of the core between both end positions PE1 and PE2. The position sensor 56 is sensitive to magnetic field variations, for example it is a Hall effect sensor.

Figure 3A:
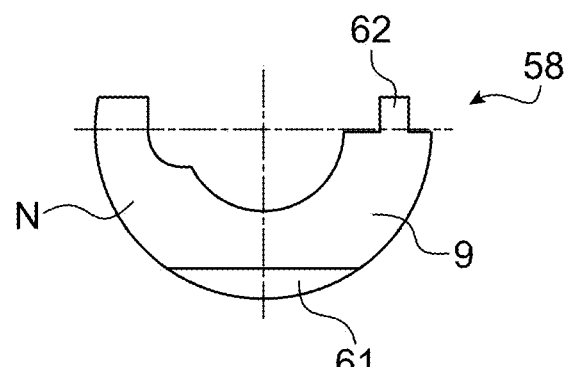
FIG. 3A is a top view of an example of a magnet of the position sensor.

The position sensor is mounted to a second electronic board PCB2, and a permanent magnet 58 attached to the output shaft A and positioned relative to the position sensor 56 so that its rotational movement, and hence that of the output shaft, is detected by the position sensor 56. As can be seen in FIG. 3C, the position sensor is arranged in a vertical line with a portion of the position magnet when considering the longitudinal direction. The distance between the magnet and the sensor 56 is, for example, 1.2 mm±0.2 mm The magnet 58 is derived from a diametrically magnetised ring magnet, i.e. in which the field lines are aligned with the diameters. The magnet is formed from an angular portion of the ring magnet. The south S and north N poles are depicted in FIG. 3A. The magnet 58 is for example made from a mixture of Neodymium, iron and boron powders and a binder, such as Polyamide PA12, for example by injection.

The second electronic board PCB2 is arranged axially away from the first electronic board PCB1. In the example represented, the board PCB2 and the position sensor are advantageously disposed outside the case and at least partially surround the output shaft A, further isolating the position sensor from the magnet 21.

As an example, the boards are 10 mm apart. Preferably, this distance is as large as possible, thus limiting mutual disturbances.

In the example represented, the board PCB2 comprises a recess with a radius corresponding to that of the output shaft A so that it can be placed as close as possible to the same.

The position sensor 56 is mounted to the second electronic board PCB2 in such a way that the magnet 58 can assume angular positions that have little or no effect on the management sensors 17.

Figure 3B:
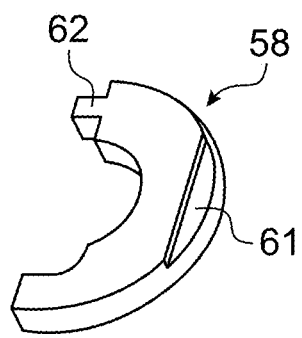
FIG. 3B is a perspective view of the magnet of FIG. 3A.
Figure 3C:
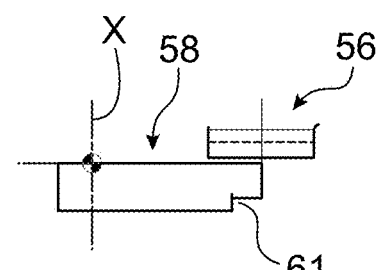
FIG. 3C is a side view showing the relative positions of the position magnet and the position sensor.
Figure 3D:
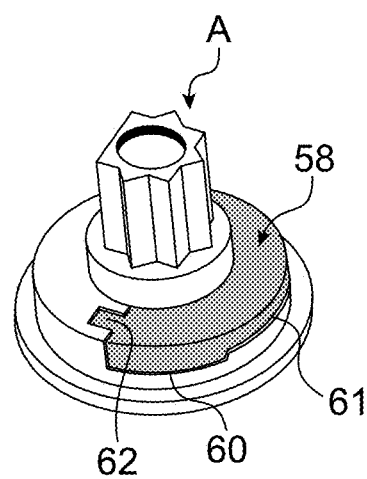
FIG. 3D is a perspective view of the output shaft and position magnet.

As can be seen in FIGS. 3A, 3B and 3D, the magnet 58 has the shape of an arc of a circle and its angular extension is such that, when the output shaft A is in either of the end positions PE1, and PE2, the magnet is still facing the position sensor and is such that, considering the projection in the same plane orthogonal to the axis X of the management sensors and the magnet 58, no part of the projection of the position magnet 58 is facing the management sensors in the radial direction.

The position sensor 56 measures the angle B (°) between the sensor and the magnet, this angle is measured between the radius passing through a median zone of the position sensor 56 and the radius passing through the junction zone of both poles.

Figure 4A:
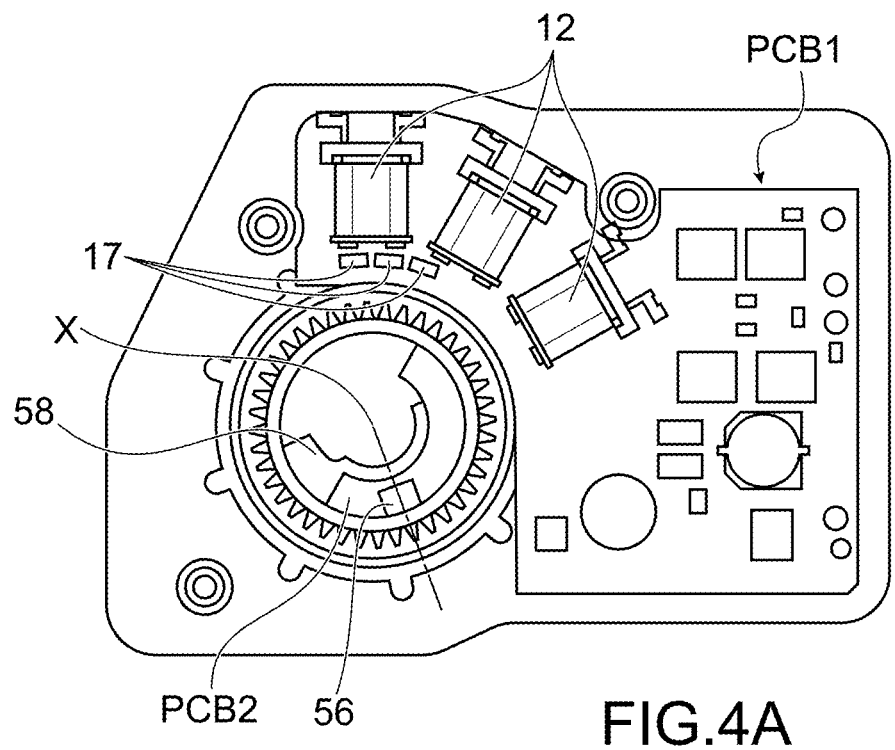
FIG. 4A is a bottom view of the gear motor of FIG. 2, where some parts have been omitted to show the sensors and position magnet, with the position magnet in a first position on the output shaft.
Figure 4B:
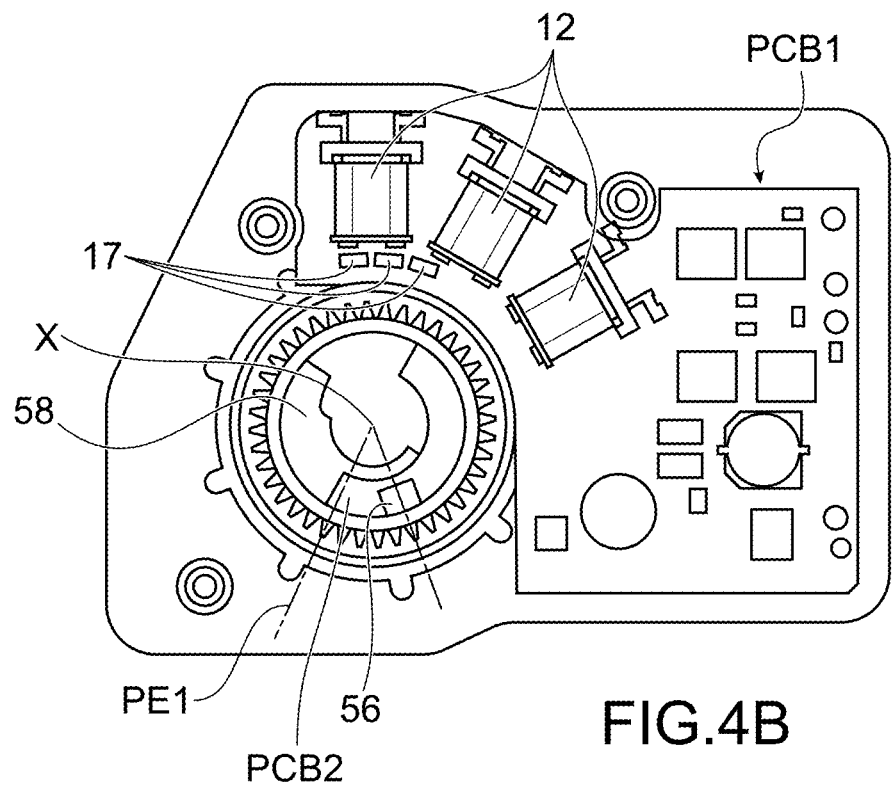
FIG. 4B is a bottom view of the gear motor similar to FIG. 4A, with the position magnet being in a second position on the output shaft.
Figure 4C:
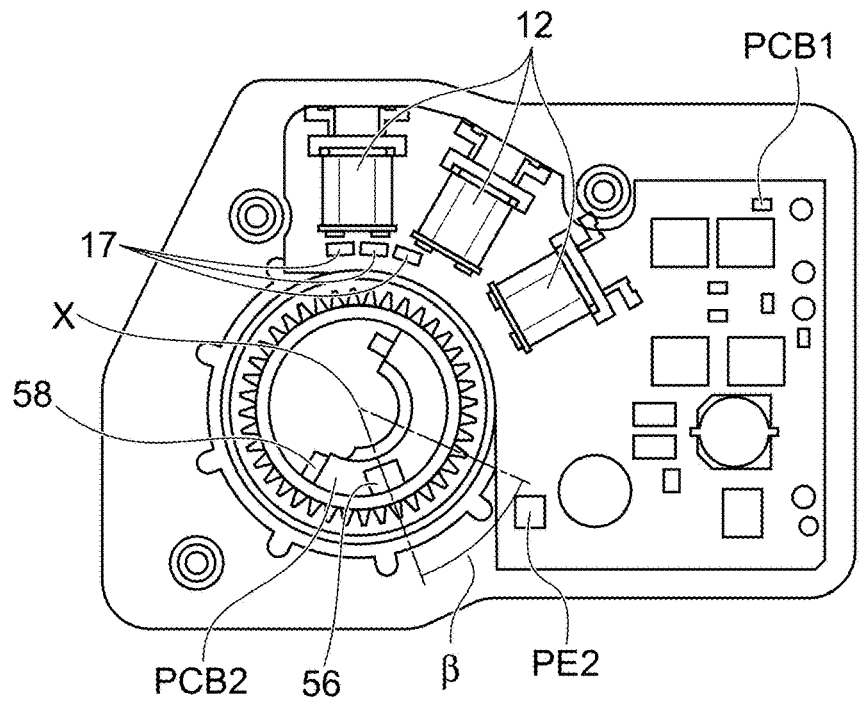
FIG. 4C is a bottom view of the gear motor similar to FIG. 4A, with the position magnet being in a third position on the output shaft.

In FIGS. 4B and 4C, the magnet 58 can be seen in both end positions PE1 and PE2 of the output shaft A. In FIG. 4A, the magnet is in a centred position with respect to the position sensor 56.

In the example represented (FIG. 3C), the magnet 58 is partly facing the position sensor 56 considering the axial direction. More particularly, it is located between both electronic boards PCB1 and PCB2.

In FIG. 3D, the output shaft A and the magnet 58 can be seen. The output shaft A comprises a downstream-orientated shoulder 60 to which the magnet 58 is mounted. The magnet is, for example, snapped and/or bonded onto the output shaft A. Advantageously, the position magnet 58 is snapped onto the output shaft. For example, the output shaft A comprises a housing for the magnet 58, which is formed in the shoulder. The magnet 58 comprises a spot facing 61 which cooperates with a flat member of the housing, and a tongue 62 projecting from an angular end of the magnet 58 and cooperates with a recess of the housing, ensuring that the magnet is at least temporarily held and foolproofed and that the north and south poles of the magnet are always mounted in the same direction. The magnet 58 is then bonded ensuring it is definitely attached to the output shaft. Preferably, bonding is achieved by polymerisation offering a good hold at high temperature. Alternatively, the housing comprises a projection received in a recess in the magnet. Preferably, the depth of the housing is such that the free surface of the magnet 58 is flush with the shoulder 60.

Preferably, the angular extension of the magnet 58 is that which has the most linear variation and offers the greatest slope, as will be explained below.

Alternatively, the magnet 58 is disposed facing the position sensor considering a radial direction, i.e. the magnet is interposed between the shaft and the position sensor. The magnetisation of the magnet is then adapted.

A practical example of the arrangement and dimensions of the sensors and the magnet 58 will be described.

The management sensors 17 are disposed next to each other at an angle $\alpha 1$ equal to 12° on the first electronic board PCB2.

The position sensor 56 is disposed on the second electronic board PCB1 about the output shaft. The angle between the position sensor and one of the management sensors located on an edge is equal to 142°.

Both end positions of the core are separated by an angle of 90°.

The magnet 58 has an angular extension of 100°. In the median position of the core and thus of the output shaft, i.e. when the core is half-way, the position sensor 56 is located at an angle of 50° from each angular end of the magnet 58 (FIG. 4A). Thus, regardless of the angular position of the output shaft A between both end positions, the position magnet 58 is always facing the position sensor. The position sensor is not point-like, but its position is considered to be that of the radius passing through the middle of the position sensor.

Regardless of the angular position of the magnet 58, none of its parts of the projection of the magnet 58 is facing a management sensor considering the radial direction (FIGS. 4B and 4C).

Advantageously, the magnet 58 and the output shaft A comprise foolproofing means for mounting the magnet to the output shaft, in order to ensure that each magnet of each distributor is mounted identically and that each position sensor provides the same response, i.e. the same voltage change as a function of the angular position of the output shaft.

Figure 5:
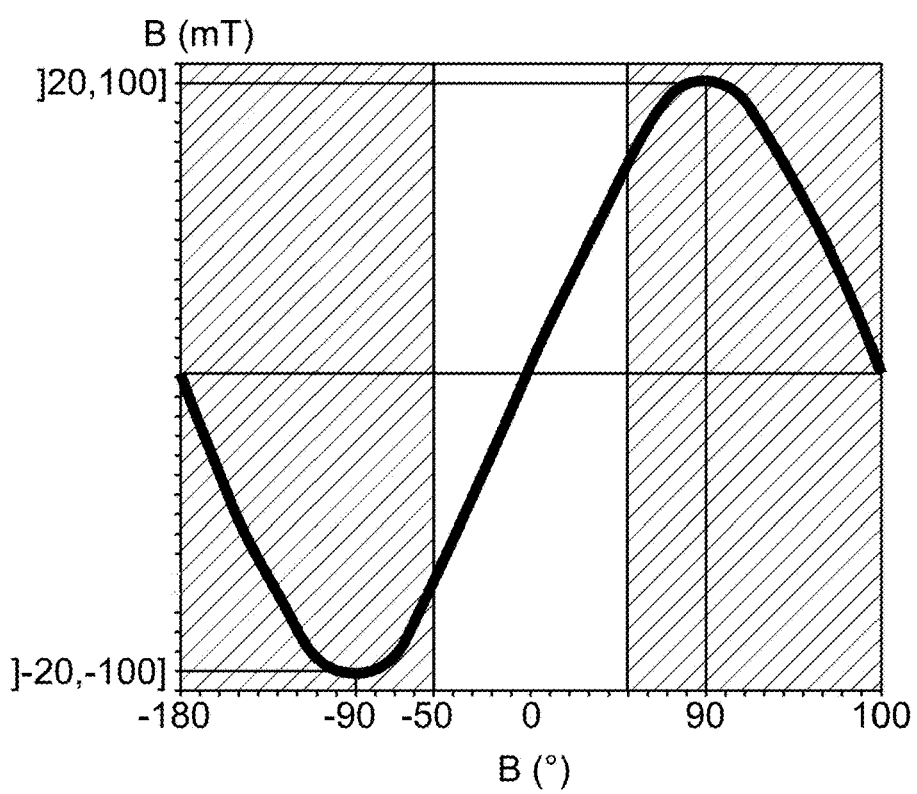
FIG. 5 is a graphical representation of the variation of the magnetic field B (mT) seen by the position sensor as a function of the angle β (°) between the position sensor and the magnet.

In FIG. 5, the variation of the magnetic field as a function of the angle $\beta$ for a diametrically magnetised ring magnet can be seen. It is observed that the angular portion between $-50°$ and $+50°$ has a substantially linear variation with a large slope.

Figure 6:
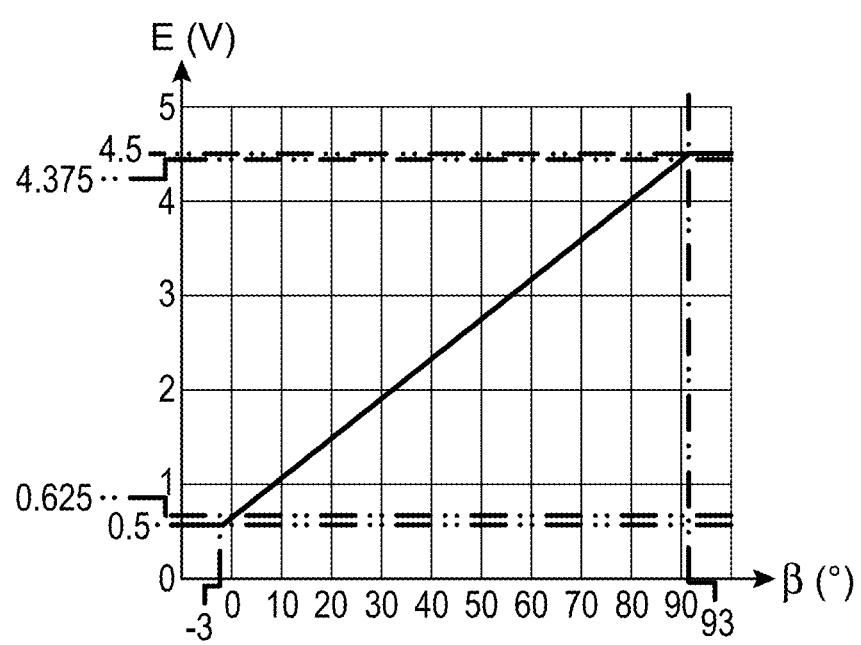
FIG. 6 is a variation in the voltage E(V) emitted by the position sensor as a function of the angle β (°) between the position sensor and the magnet.

The magnet 58 is preferably mounted so that the position sensor delivers a voltage value as a function of angular position such as that represented in FIG. 6.

If the magnet is mounted in the reverse way, i.e. with the south pole instead of the north pole, the slope of the voltage change would be negative. Advantageously, foolproofing is provided to avoid this situation.

Very advantageously, during manufacture an individual calibration step of each distributor takes place to guarantee the same angular position of the core for a given voltage.

For example, the output shaft and magnet rotate through an angle of between $-3°$ and $93°$ and the sensor observes a magnetic field B from the magnet that varies between $-100$ mT and $+100$ mT over this rotation amplitude.

The sensor is programmed so that the end position of $-3°$ and its field correspond to an output voltage of 0.5V, and so that the end position of 93° and its field correspond to an output voltage E of 4.5V. Each intermediate position is proportionally assigned a voltage.

The electronic control unit adjusts the valve position by programming the corresponding voltage value E.

The valve is a proportional valve between both outputs.

Alternatively, the valve comprises an input and an output, opening or closing of the valve being proportional.

It will be understood that the angular extension of the magnet 58 is chosen according to the angle between the end positions of the core.

In the example represented and preferably, the electric motor is a three-phase motor comprising a number of coils 12 multiple of three evenly angularly distributed about the axis X. Nevertheless, a two-phase motor, and more generally a polyphase motor, does not depart from the scope of the invention.

The external shape of the gear motor is not restrictive, it is chosen according to the environment of the motor and manufacturing possibilities.

The hydraulic distributor is particularly adapted for the automotive field, especially for cooling internal combustion engines, but it can be used in any other field.

The invention claimed is:

1. A rotary fluid distributor comprising a valve body with at least one fluid inlet port and one fluid outlet port, a core capable of allowing or interrupting the flow of fluid between the inlet port and the outlet port, said core being rotatably movable about a longitudinal axis and configured to assume two end angular positions, a gear motor comprising a gear reducer, a brushless electric motor and an output shaft with a longitudinal axis, the core being rotatably secured to said output shaft, sensors for managing the electric motor mounted to a first electronic board facing a side face of a rotor of the gear motor, at least one angular position sensor for detecting the angular position of the output shaft, mounted to a second electronic board, the first electronic board and the second electronic board being disposed in two distinct planes orthogonal to the longitudinal axis, a permanent magnet rotatably fixedly mounted to the output shaft and disposed so as to be detected by the angular position sensor, wherein said permanent magnet has the shape of an arc of a circle whose position and angular extension are such that whatever the angular position of the output shaft to place the core in any position between its end angular positions, considering a projection of said magnet and the projection of the management sensors onto the same plane orthogonal to the longitudinal axis, the projection of the permanent magnet does not face the projection of the management sensors considering a radial direction.

2. The rotary fluid distributor according to claim 1, wherein the gear motor comprises a casing housing the motor and the gear reducer and wherein the first electronic board is housed in the casing and the second electronic board is disposed outside the casing between the casing and valve body.

3. The rotary fluidic distributor according to claim 1, wherein the permanent magnet is a diametrically magnetised magnet.

4. The rotary fluidic distributor according to claim 1, wherein the valve body comprises two outlet ports, and wherein one of the end angular positions corresponds at least predominantly to flow between the inlet port and one of the outlet ports, and the other end angular position corresponds at least predominantly to flow between the inlet port and one of the outlet ports.

5. The rotary fluid distributor according to claim 1, comprising an orientation device for orientating the permanent magnet relative to the output shaft so as to position the north pole and south pole of the magnet in a given orientation relative to the output shaft.

6. The rotary fluidic distributor according to claim 5, wherein the orientation device comprises a spot facing formed in the magnet cooperating with a flat member carried by the output shaft and a projecting element carried by the output shaft or the permanent magnet cooperating with a recessed element carried by the permanent magnet or the output shaft respectively.

7. The rotary fluidic distributor according to claim 1, wherein the permanent magnet is bonded to the output shaft.

8. The rotary fluidic distributor according to claim 1, wherein the motor comprises coils attached and electrically connected to the first electronic board.

9. The rotary fluidic distributor according to claim 8, comprising three or a multiple of three coils.

10. The rotary fluid distributor according to claim 1, wherein the gear reducer is at least partly housed in the rotor.

11. The rotary fluid distributor according to claim 1, wherein the gear reducer is a planetary gear reducer, the gear motor comprising a single axis forming the axis of rotation of the rotor and the axis of the planetary gear reducer.

* * * * *